(12) United States Patent
Pareglio et al.

(10) Patent No.: US 9,794,327 B2
(45) Date of Patent: Oct. 17, 2017

(54) METHOD AND SYSTEM FOR COMMUNICATION BETWEEN MACHINE TO MACHINE M2M SERVICE PROVIDER NETWORKS

(75) Inventors: Barbara Pareglio, Breda (NL); Hendrikus Andrianus Antonia Maria van der Velden, Eindhoven (NL)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 217 days.

(21) Appl. No.: 14/427,040

(22) PCT Filed: Sep. 10, 2012

(86) PCT No.: PCT/EP2012/067613
§ 371 (c)(1),
(2), (4) Date: Apr. 1, 2015

(87) PCT Pub. No.: WO2014/037055
PCT Pub. Date: Mar. 13, 2014

(65) Prior Publication Data
US 2015/0244776 A1    Aug. 27, 2015

(51) Int. Cl.
*H04L 29/08* (2006.01)
*H04L 29/12* (2006.01)
*H04W 4/00* (2009.01)

(52) U.S. Cl.
CPC .......... *H04L 67/10* (2013.01); *H04L 61/1511* (2013.01); *H04W 4/005* (2013.01)

(58) Field of Classification Search
CPC ..... H04L 67/10; H04L 61/1511; H04W 4/005
(Continued)

(56) References Cited

U.S. PATENT DOCUMENTS 9,071,925 B2 * 6/2015 Viswanathan ........ H04W 4/005
9,654,359 B2 * 5/2017 Lin ..................... H04L 41/5077
(Continued)

FOREIGN PATENT DOCUMENTS

WO    2011112683 A1    9/2011
WO    2012118711 A2    9/2012

OTHER PUBLICATIONS

Russell, Paul, Jr., "M2M SCL Discovery Procedures", European Telecommunications Standards Institute M2M#14bis Meeting, ETSI/M2M(11) 0109, InterDigital Communications, Mar. 28-Apr. 1, 2011, 1-8.
(Continued)

*Primary Examiner* — Kostas Katsikis
(74) *Attorney, Agent, or Firm* — Murphy, Bilak & Homiller, PLLC

(57) ABSTRACT

Machine-to-Machine (M2M) communication has been described for communication in a single network in among others publications from the European Telecommunications Standards Institute (ETSI). The publications describe a single network with defined entities, a resource structure and protocols. According to the invention, a solution is described for communication between entities residing in different M2M networks. Entities or applications residing in a first M2M network requiring information of an entity in another second M2M network submit a request with a target ID pointing to the entity in the second M2M network. The request is forwarded to the network node of the first network. The network node of the first network checks whether the target ID matches with an entity of a second network that according to a Domain Name Server (DNS) lookup has an address of a second network node of the second M2M network. On a match the request is routed towards the retrieved second network node of the second M2M network. The second network node routes the request further towards (Continued)

the second entity according to registration information stored in its resources. On reception of the request the second entity processes the request and returns a reply via the path created by the previous steps.

15 Claims, 12 Drawing Sheets

(58) Field of Classification Search
USPC .................................. 709/204, 218, 238
See application file for complete search history.

(56) References Cited

U.S. PATENT DOCUMENTS

| | | | |
|---|---|---|---|
| 9,654,900 B2* | 5/2017 | Seed | H04W 4/005 |
| 2008/0086574 A1* | 4/2008 | Raciborski | H04L 29/12066 709/245 |
| 2010/0011420 A1* | 1/2010 | Drako | G06Q 10/107 726/5 |
| 2010/0304716 A1* | 12/2010 | Hoeksel | H04W 4/005 455/411 |
| 2011/0140846 A1* | 6/2011 | Blanz | H04W 60/04 340/7.1 |
| 2011/0191835 A1* | 8/2011 | Hawkes | H04W 12/08 726/6 |
| 2011/0201365 A1* | 8/2011 | Segura | H04W 4/005 455/466 |
| 2012/0016942 A1* | 1/2012 | Cherian | H04W 4/00 709/206 |
| 2012/0033613 A1* | 2/2012 | Lin | H04W 74/085 370/328 |
| 2012/0047551 A1* | 2/2012 | Pattar | H04W 4/00 726/1 |
| 2013/0094444 A1* | 4/2013 | Lai | H04W 8/265 370/328 |
| 2013/0308566 A1* | 11/2013 | Foti | H04W 76/021 370/329 |
| 2013/0318218 A1* | 11/2013 | Foti | H04W 72/0406 709/222 |
| 2013/0343231 A1* | 12/2013 | Foti | H04L 12/1407 370/259 |
| 2014/0086144 A1* | 3/2014 | Foti | H04L 61/106 370/328 |
| 2014/0089478 A1* | 3/2014 | Seed | H04W 4/001 709/222 |
| 2014/0351403 A1* | 11/2014 | Lin | H04W 8/06 709/223 |
| 2015/0055640 A1* | 2/2015 | Wang | H04W 4/005 370/338 |

OTHER PUBLICATIONS

Unknown, Author, "Machine-to-Machine communications (M2M); Functional architecture", ETSI TS 102 690 V1.1.1, Oct. 2011, 1-280.

Unknown, Author, "Machine-to-Machine communications (M2M); Functional architecture", ETSI TS 102 690 V2.0.8, Aug. 2012, 1-293.

Unknown, Author, "Machine-to-Machine communications (M2M); M2M service requirements", ETSI TS 102 689 V1.1.1, Aug. 2010, 1-34.

Unknown, Author, "Machine-to-Machine communications (M2M); mIa, dIa and mId interfaces", ETSI TS 102 921 V1.1.1, Feb. 2012, 1-538.

* cited by examiner

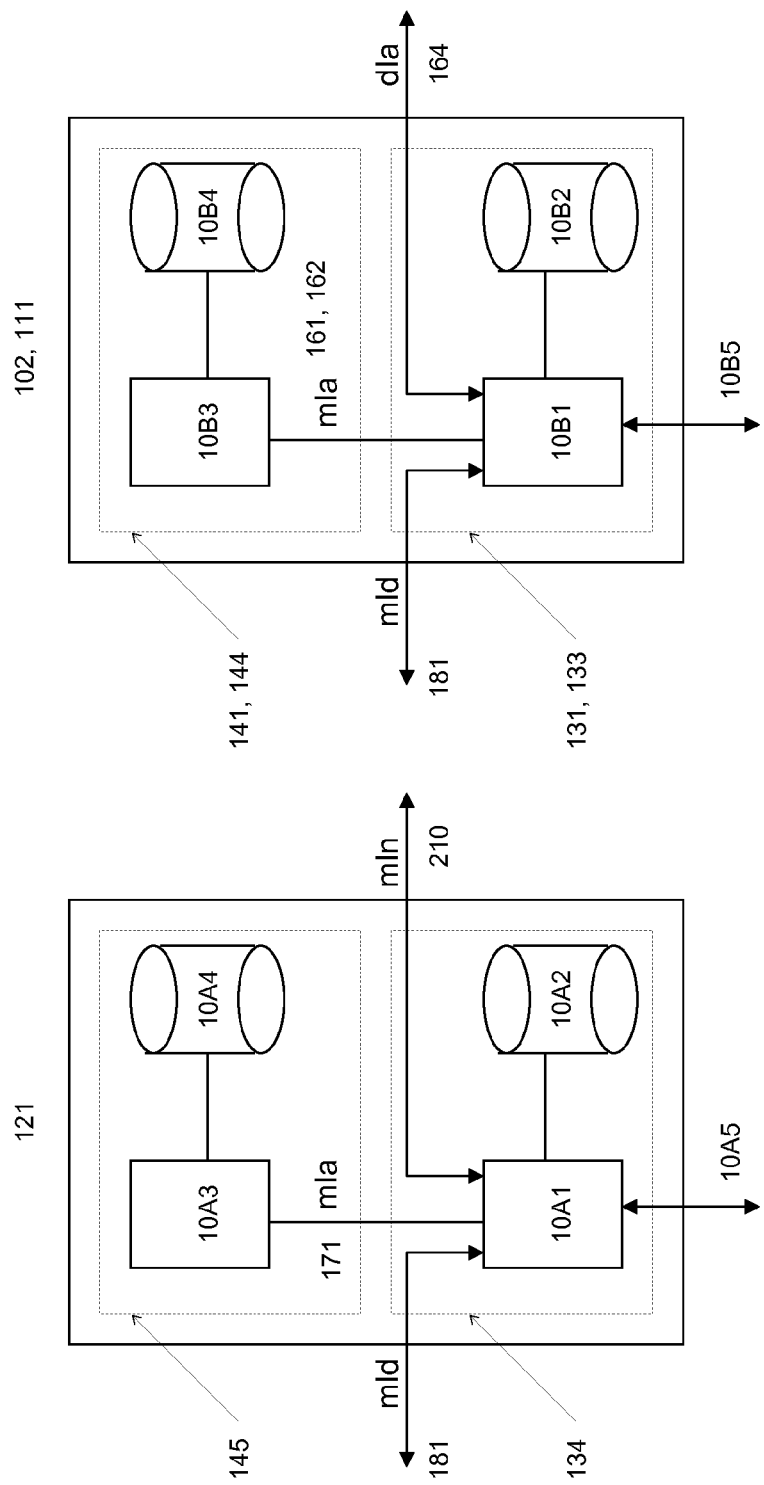

METHOD AND SYSTEM FOR COMMUNICATION BETWEEN MACHINE TO MACHINE M2M SERVICE PROVIDER NETWORKS

FIELD OF THE INVENTION

The present invention relates generally to enablement of a communication network comprising devices that communicate without human intervention. More particularly, the present invention facilitates a method and system for initialising communication in a Machine-to-Machine (M2M) environment in an efficient way.

BACKGROUND OF THE INVENTION

As network availability in devices spreads, and network access coverage increases, there is an increasing demand to create a network of connected things or devices. Where the first drive of the telecommunications industry was to connect locations to each other, and ask users to travel to one of the connected locations, and the second drive of the industry was creating mobile connections so that people could be connected regardless of locations, a third phase for connectivity is being entered. In this third phase, there is an interconnection of devices.

Whether these devices are mobile, such as actuators in transportation systems, or fixed in locations such as sensors on a utility meter, devices are being connected to each other and to network applications or services.

However, a problem is foreseen in that as the number of devices will increase, the problem of managing these devices will also grow. Furthermore, the manner in which the devices are connected to a network can affect how they are managed and communicate.

As among one of the recognized authorities on standardization of communication technology, the European Telecommunications Standards Institute (ETSI), has taken the initiative to develop standards to support industry for enabling ease for connectivity between the devices i.e. sensors and actuators, as well as applications and services.

By means of standards, innovation across industry is facilitated, enabling exposure of data and information as well of provision of services.

ETSI has defined a standard for machine-to-machine (ETSI M2M) communication where devices communicate and exchange information via a defined structure of database-like resources. The standard is described in a.o. the following documents:

TS 102 689—Service Requirements: which provide a high level requirements for an M2M Service Layer TS 102 690—Functional Architecture. The architecture which entities are required as to deploy device communication and management in an M2M network.

TS 102 921—mIa, dIa and mId interfaces. The document provides the protocol specification for the three reference points mIa, dIa and mId.

The ETSI M2M suite, comprising the standards listed above, provides a Machine-to-Machine (M2M) architecture with a generic set of capabilities for M2M services and provides a framework for developing services independently of the underlying network.

The ETSI M2M suite is generally based on a number of defined physical entities and a number of defined resources. The resources comprise information to be shared or exchanged, and are organised in so called Service Capability Layers (SCLs), according to a REpresentational State Transfer (RESTful) architecture style.

The RESTful architecture style, generally applied by ETSI M2M, represents a tree wherein the SCL maintains a resource structure where the information to be shared or exchanged is stored and updated.

Communication to and from the resources, comprised by the SCLs, is defined by procedures over dedicated interfaces, called "reference points".

The entities forming a network are organised in a pyramid like structure where (multiple) devices (sensors and actuators) form the basis and a Network node, also denoted as Network server or Network domain server, comprising a Network Service Capability Layer (NSCL), forming the top of the pyramid.

The device might be a very simple device, such as a contact switch sensor, only able to provide on-off data, or an actuator such as a relay to turn on or off a heating element. On the other extreme a device can be a complex remote sensor with a local application that provides compressed and encrypted strings of data on e.g. received radiation units on request.

ETSI M2M has defined the concepts of an M2M application and an M2M Service Capability Layer (SCL), being processing units comprised by physical entities. The application has to register over a defined reference point with an SCL. The SCL to be registered with, called "the local SCL" in ETSI M2M terms, is either the SCL locally available in the same entity where the application resides, or if not locally available, in the first higher SCL in the pyramid.

The SCL enables an application to use the M2M communication suite. The ETSI M2M SCL can generally be seen as a database, having a defined record structure, using defined interfaces, the reference points, for communication with other SCLs and Applications, and is arranged to perform functions such as relaying information to other SCLs, store and forward functionality, expiration time handling, policy enforcement, etc.

ETSI M2M had defined (until now) a number of different entities, a Device (D and D' also known as "D prime"), a Gateway (G) and a Network node (N). The D' entity comprises an Application only. The D, G and N entities comprise an SCL an may further comprise an Application.

The G entity has been introduced to connect D' entities in a local area level. The G entity enables M2M communication to other entities in the M2M network by means of its SCL.

Multiple G entities comprising Gateway SCLs (GSCLs) and optionally Gateway Applications (GAs) could be connected to an N entity such that a pyramid-like structure is formed.

In this way a Network Application (NA) comprised by the N entity can communicate with- or control- the connected D- and G-entites.

ETSI M2M indicates that an address of a resource representing Device Application (e.g. with identifier DA1) registered with the SCL of an NSCL (e.g. with identifier NSCL1) has the identifier:

"<sclBase for NSCL1>/applications/DA1".

The pyramid-like topological structure of the entity which hosts DA1 is not represented in this identifier. The sequence is independent from underlaying physical networks.

Device applications are generally understood as applications that in case for a sensor, retrieve the data of the sensor and store (or "update" in M2M terms) the data into the resource of the one or more SCLs where the application has been registered to. In case for an actuator, the application may e.g. read the resource of the SCL where the application has been registered with, or reacts on a notification message, and controls the actuator according to the value indicated in the resource read or notification received respectively.

Gateway- and Network applications are understood as applications that process data received from Device Applications and submit requests to Device Applications to be executed.

There is a substantial demand to connect numerous devices which may connect via fixed and cellular data networks as well as wireless network interface such as WiFi (IEEE 802.11).

However not all devices can be expected to reside in a single network, operated by a single M2M provider, just as in the ETSI M2M standards listed above is presented.

A problem is raised in how devices can initialise and establish communication when different M2M networks are maintained by different M2M service providers, having no D entities connected via the same G or N entities.

As an example of the problem stated, a solution is required for a situation where an entity in a first M2M Service provider network has to retrieve information that is stored in a resource residing in one or more entities of a second M2M Service Provider network

SUMMARY OF THE INVENTION

It is an object of the present invention to provide a method and system to enable communication between Machine-to-Machine (M2M) devices, applications or services that do not belong to the same network M2M network.

A solution is presented below for allowing devices attached to a specific M2M Service Provider network to utilize service and communicate to devices from other M2M networks belonging to one or more other M2M Service Providers.

The invention is explained in an example according to a REpresentational State Transfer (RESTful) architecture style, applied by the European Telecommunications Standards Institute (ETSI), for M2M communication.

The solution to the problem is discussed as a method where a first entity, being an application or an entity, residing in a first network needs to communicate, e.g. retrieve or exchange information, with a second entity, residing a second, different network.

Both networks are M2M networks, having a topologically pyramid-like structure with a single network node on top of the network. Each of the M2M networks, comprise the network node and one or more entities and applications which are communicatively connected to each other according to the topologically pyramid-like structure.

The entities that support the communication, comprise resources for exchanging information, are arranged in a tree-like structure.

The explanation of the solution is based on the rules:

All communication between both networks has to pass the network nodes of the M2M networks, each having a link to the other network node.

Each resource has a determined location in the tree-like structure, and a determined meaning in the entity, thereby enabling addressing.

The applications and entities within each network have to register to each other in an upward direction in the pyramid-like structure until the network node on the top has received registrations of the applications and entities risiding directly (one step) below under the network node. The remaining applications and entities in the M2M network that are not registered with the network node are registered with their superior entity.

A first entity transmits a request addressed for the second entity in the direction of a first network node of the first network. This first network node receives the request that comprises an identifier which identifies the addressed second entity.

Subsequently the first network node checks its resources for a matching reference which can be comprised by the first network node's resources, having the identified address of the second entity.

However, when no match is found, the first network node will request a Domain Name server, DNS for a lookup on a hostname comprised by the request. The DNS responds with the address of a second network node, the second node where the the second entity has been registered to. The first network node, receiving the DNS reply will route the request to the retrieved second network node, and the second network node will forward the request to the second entity.

The second entity finally receives the request and starts processing of the request, and responds to the first entity via a path created by the previous steps.

The first network node in the M2M network has to perform a number of steps elucidated here. Firstly it receives the request that comprises an identifier identifying the addressed second entity.

Subsequently it checks its resources for a matching reference comprised by the first network node's resources, with the identified address of the second entity.

When the first network node finds no match, the first network node requests a Domain Name server (DNS), to do a lookup on a the hostname comprised by the request.

The DNS submits a reply that ios received by the first network node. This reply comprises the address of a second network node, being a node where the second entity has been registered to. Finaly the first network node routes the request according to the retrieved second network node;

The term "resource" should generally be understood as one or more memory locations in an SCL, enabled for being read and updated according to the setting of attributes, defining which entity may read or update.

The term "update" should generally be understood as storing one or more values into a resource.

The elucidation for the method claims does also apply for the corresponding embodiment of the listed methods to the system entities as claimed.

The method, node and system presented has the advantage of re-using a Domain name Server (DNS) for spreading the knowledge of remote resources.

These and other embodiments according to the present invention are now illustrated in more detail with reference to the enclosed drawings.

BRIEF DESCRIPTION OF THE DRAWINGS

FIG. 10A illustrates schematically a node comprising an NSCL.

FIG. 10B illustrates schematically a node comprising an DSCL or GSCL.

DETAILED DESCRIPTION

Without restrictions to the scope of the invention, in order to provide a thorough understanding of the present invention, the invention is presented against the background and within the scope of the current published standards suite of the European Telecommunications Standards Institute (ETSI), regarding Machine-to-Machine (M2M) communication, referred here as ETSI M2M.

However, the present invention may be applied in any context of a device-to-device, or M2M communication deploying a RESTfull style architecture, deployed in networks having a pyramid like topology. Apart from the ETSI M2M initiative, the proposed solution can be applicable to the oneM2M initiative or the M2M or Internet of things initiative by the Telecommunications Industry Association's (TIA).

Figure 1:
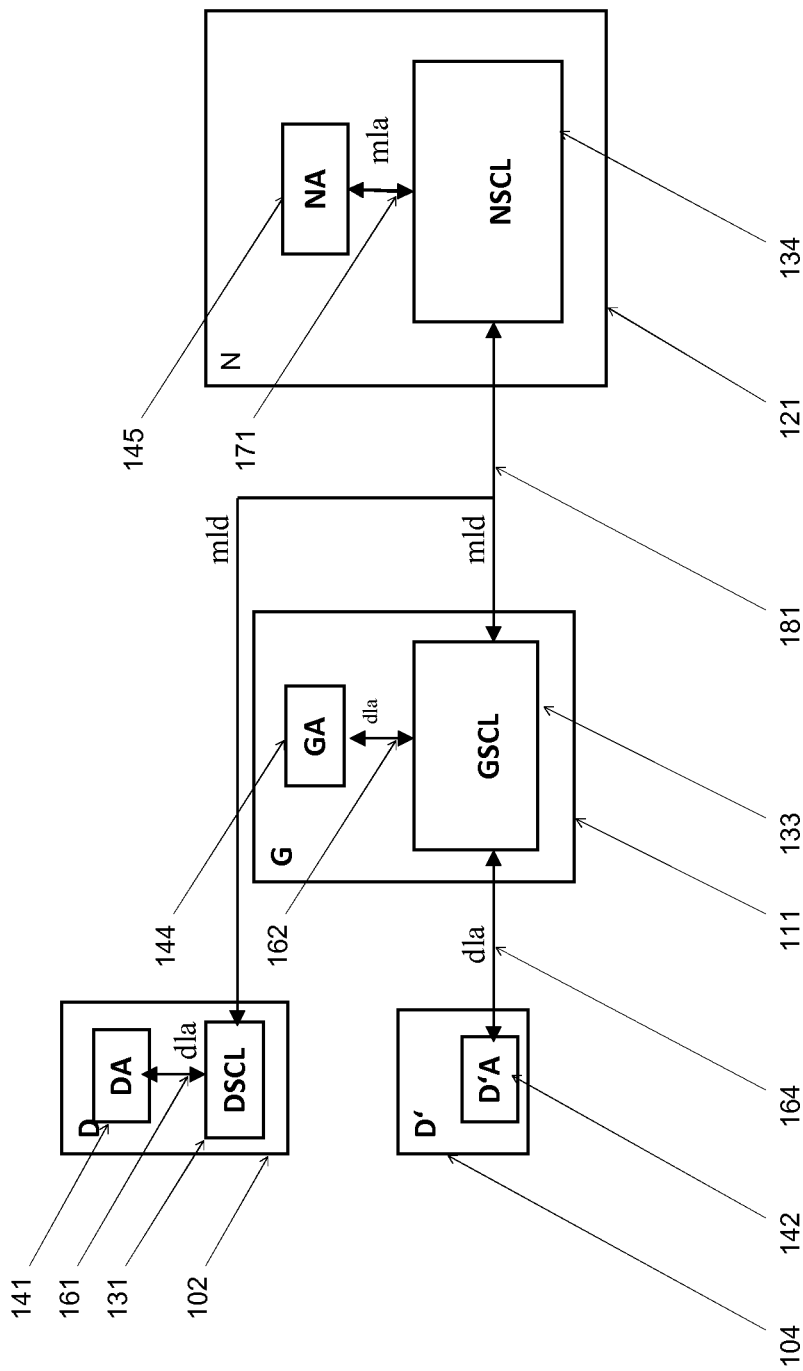
FIG. 1 illustrates schematically a network architecture with entities organized in a pyramid like topology.

FIG. 1 illustrates schematically a network architecture with entities organized in a pyramid like topology.

For the remainder of this description abbreviations are used wherein;
SCL: Service Capability Layer
DSCL: Device Service Capability Layer
GSCL: Gateway Service Capability Layer
NSCL: Network Service Capability Layer
DA: Device Application
GW: Gateway Application
NA: Network application The architecture defined by ETSI M2M assumes that physical entities, such as Devices 102, 104, Gateway 111 and Network node 121 belong to a single M2M service provider.

Applications 141, 142, 144, 145 and the Service Layer Capabilities DSCL 131, GSCL 133 and NSCL 134, belong to a single M2M Service Provider. The ETSI M2M standard specification does not describe how an application or an SCL belonging to the M2M Service Provider can obtain information produced by an application or SCL that riside on a second different M2M Service Provider serving a different M2M network.

FIG. 1 also presents the defined reference points (interfaces) between Applications and SCLs and between SCLs.

Reference point "dIa" 161, 162, and 164 refers to the interface between a Device- or Gateway-Application (DA, GA) and an SCL.

Reference point "mIa" 171 refers to the interface between the Network Application (NA) 145 and the NSCL 134.

Reference point "mId" 181 refers to the interface between DSCL/GSCL and the NSCL 134.

FIG. 1 depicts only a minimum number of entities that are required to explain the solution. It should be realized that an M2M network might comprise numerous Gateway and Device entities organised in a pyramid like structure.

It should be regarded that Physical entities e.g. 102, 104, 111, 121 might comprise applications and/or SCLs for other M2M providers.

For the explanation of the invention it is regarded that entities only comprise applications and/or SCLs of one M2M service provider.

Figure 2:
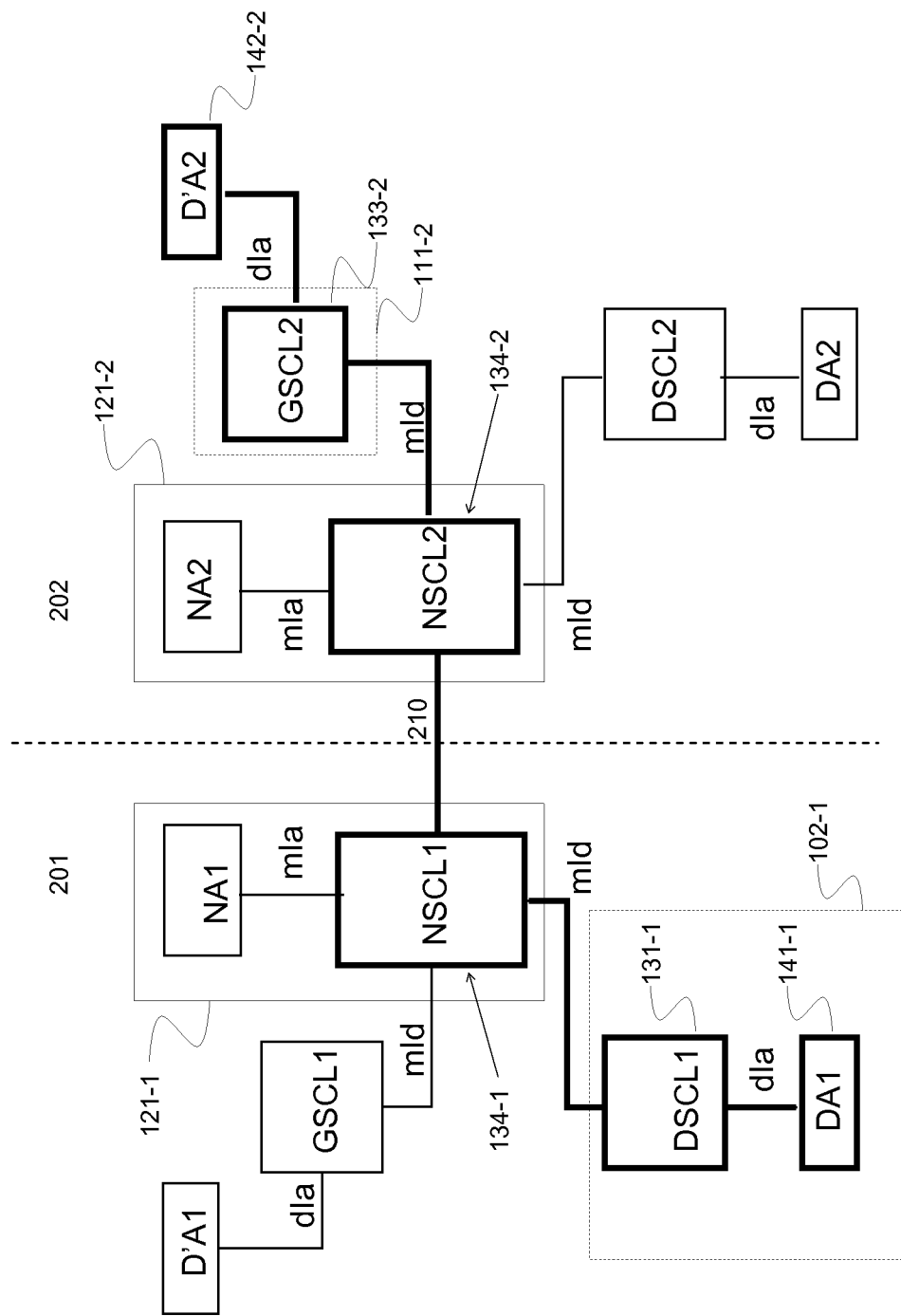
FIG. 2 illustrates schematically a network architecture with more than one independent ETSI M2M network maintained by two different M2M providers.

FIG. 2 illustrates schematically a network architecture with more than one independent ETSI M2M network maintained by two different M2M providers.

As to indicate in which network a certain entity, Application or SCL according to FIG. 1 resides, the reference sign indicating the physical entity, application or SCL for the remainder of this description, is expressed as "XXX-Y" wherein "XXX" represents the physical entity, application or SCL corresponding to FIG. 1, and "Y" represents a network indicator where "1" represents a first network and "2" represents a second network as indicated in FIG. 2.

FIG. 2 has been generally limited to represent parts of the network of FIG. 1 that are relevant for the explanation of the solution.

A first M2M network provider maintains network 201 and a second M2M network provider maintains network 202. A connecting interface 210 is depicted, connecting bidirectionally both NSCLs 134-1 and 134-2 hosted by the network nodes comprised by both networks.

The Invention proposes an interface and method to have devices or applications from the first network 201, be enabled to communicate with devices or applications of network 202.

The ETSI M2M standards do not define a reference point between NSCLs.

The Invention is explained with an example problem of how to have the application 141-1, hosted by entity 102-1, have retrieve information that is stored in resources comprised by GSCL 133-2, comprised by Gateway 111-2.

The GSCL 133-2 comprises data in its RESTful data structure, related to Device Application 142-2.

Before any communication can be established, ETSI M2M requires registration procedures, as to create a structure of resources for exchanging data. Resources can be created in procedures according to attributes, defining which entity may perform which action.

Figure 3A:
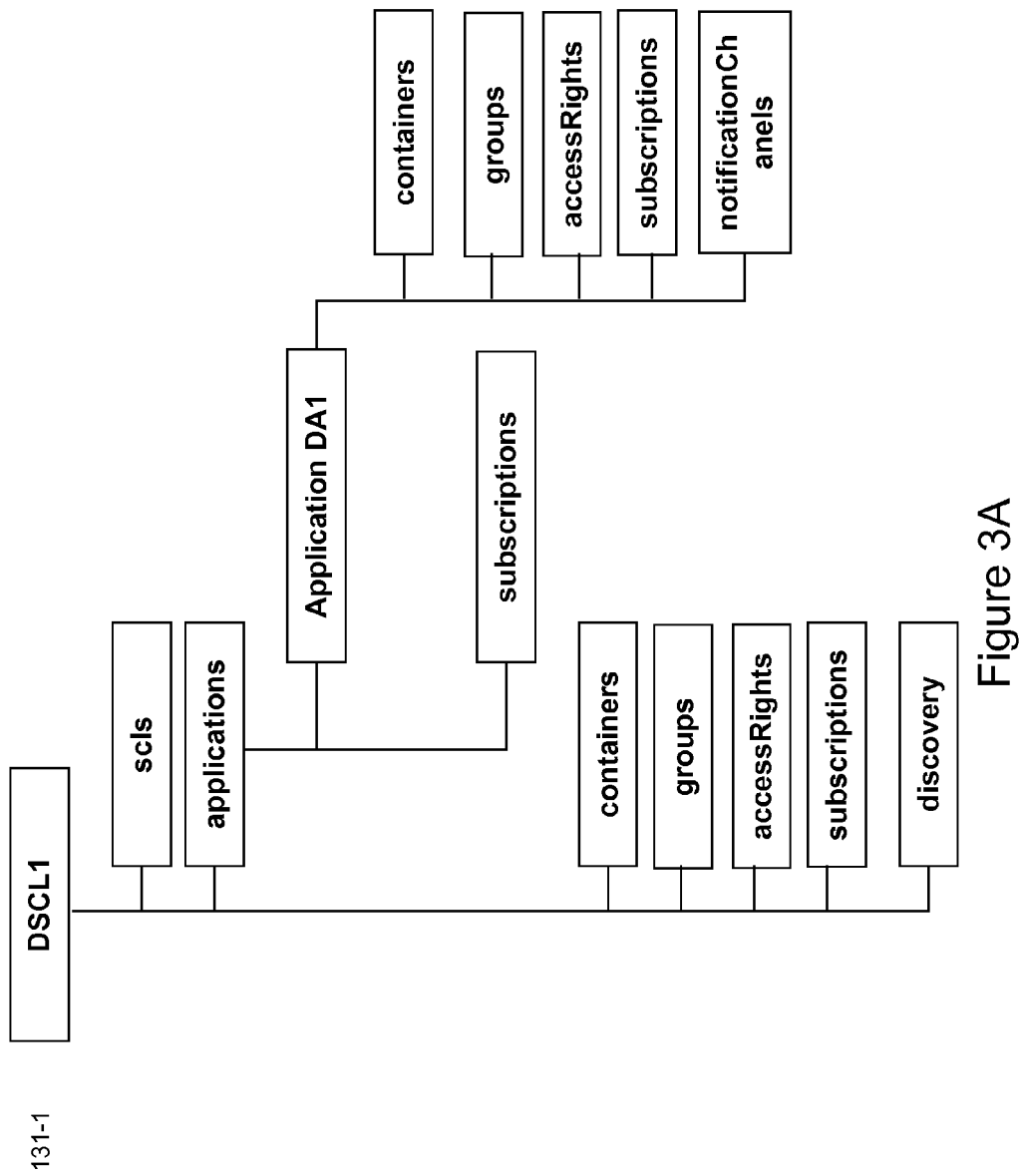
FIG. 3A illustrates schematically a part of the RESTful architecture of an DSCL where a Device Application registers.

FIG. 3A illustrates schematically a part of the RESTful architecture of an DSCL where a Device Application registers.

For illustrative simplicity the identifiers identifying SCLs and Applications and strings used in requests apply the name of the SCL according to "XSCLY", and for applications "XAY" wherein:
"X" denotes a Device "D", a Gateway "G" or a Network node "N", and "Y" denotes either the first 201 "1" or the second 202 "2" network.

FIG. 3A presents the DSCL1 131-1 tree structure comprising an applications resource representing DA1 141-1, that has been created after an application registration of DA1 141-1. The application resource DA1 comprises a resource structure, showing a.o. containers, groups etc.

The address of the application resource DA1 where the structure has been created is indicated by "<sclBase for DSCL1>/applications/DA1".

Figure 3B:
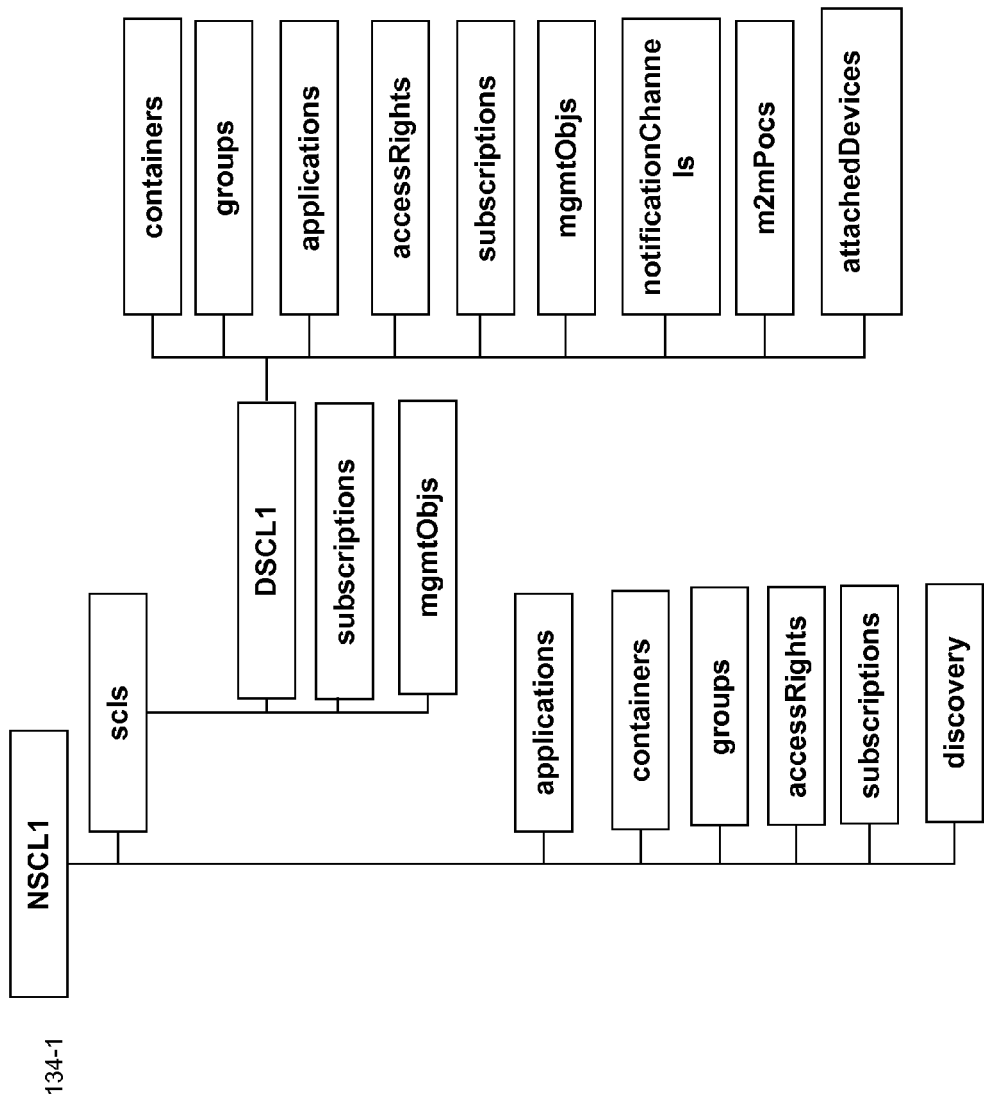
FIG. 3B illustrates schematically a part of the RESTful architecture of an NSCL where a Device SCL registers.

FIG. 3B illustrates schematically a part of the RESTful architecture of an NSCL where a Device SCL registers.

FIG. 3B shows the NSCL1 134-1 tree structure comprising an scls resource DSCL1, that has been created after registration of the DSCL 131-1 with the NSCL 134-1. The scls resource DSCL1 comprises a resource structure, showing a.o. containers, groups, etc.

The address of the scls resource DSCL1 where the structure has been created is indicated by "<sclBase for NSCL1>/scls/DSCL1".

Figure 3C:
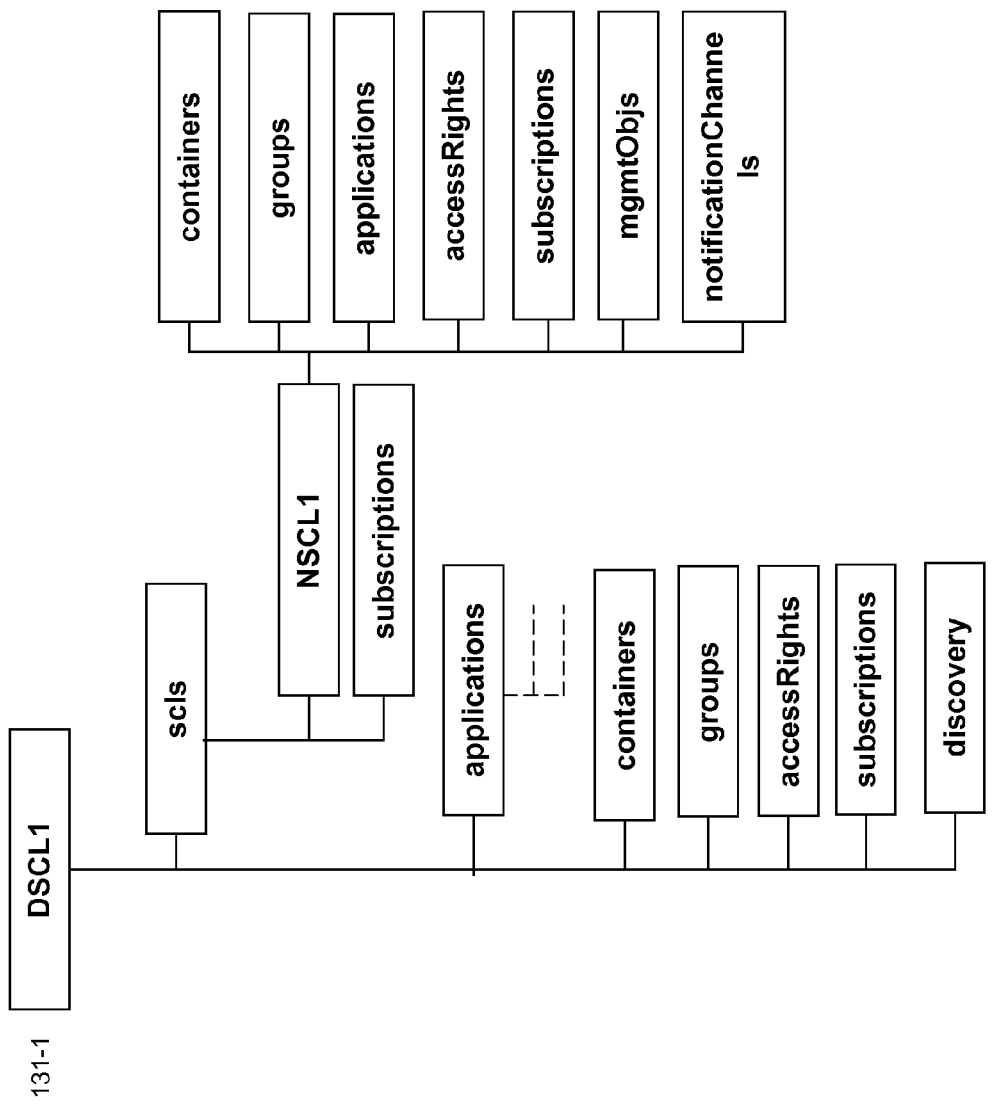
FIG. 3C illustrates schematically a part of the RESTful architecture of a DSCL, showing the result of the DSCL registration to an NSCL.

FIG. 3C illustrates schematically a part of the RESTful architecture of a DSCL, focussing on the result of the DSCL registration to an NSCL, thereby omitting a.o. the applications resource, as shown and in FIG. 3A.

FIG. 3C shows the DSCL 131-1 tree structure comprising an scls resource NSCL1, that has been created after registration of the DSCL1 131-1 with the NSCL 134-1. The scls resource NSCL1 comprises a resource structure, showing a.o. containers, groups, etc.

The registration procedures at the second network 202 provide equivalent results in the scls resources of the GSCL 133-2 and NSCL 134-2. The addresses of the resources where the structures have been created in the GSCL2 and NSCL2 respectively are indicated by "<sclBase for GSCL2>/applications/D'A2" and "<sclBase for NSCL2>/scls/GSCL2". In ETSI M2M, the SCL structure of a DSCL is equivalent to an SCL of a GSCL. As such the SCL structure of DSCL1 131-1 is equivalent to GSCL2 133-2.

Figure 4:
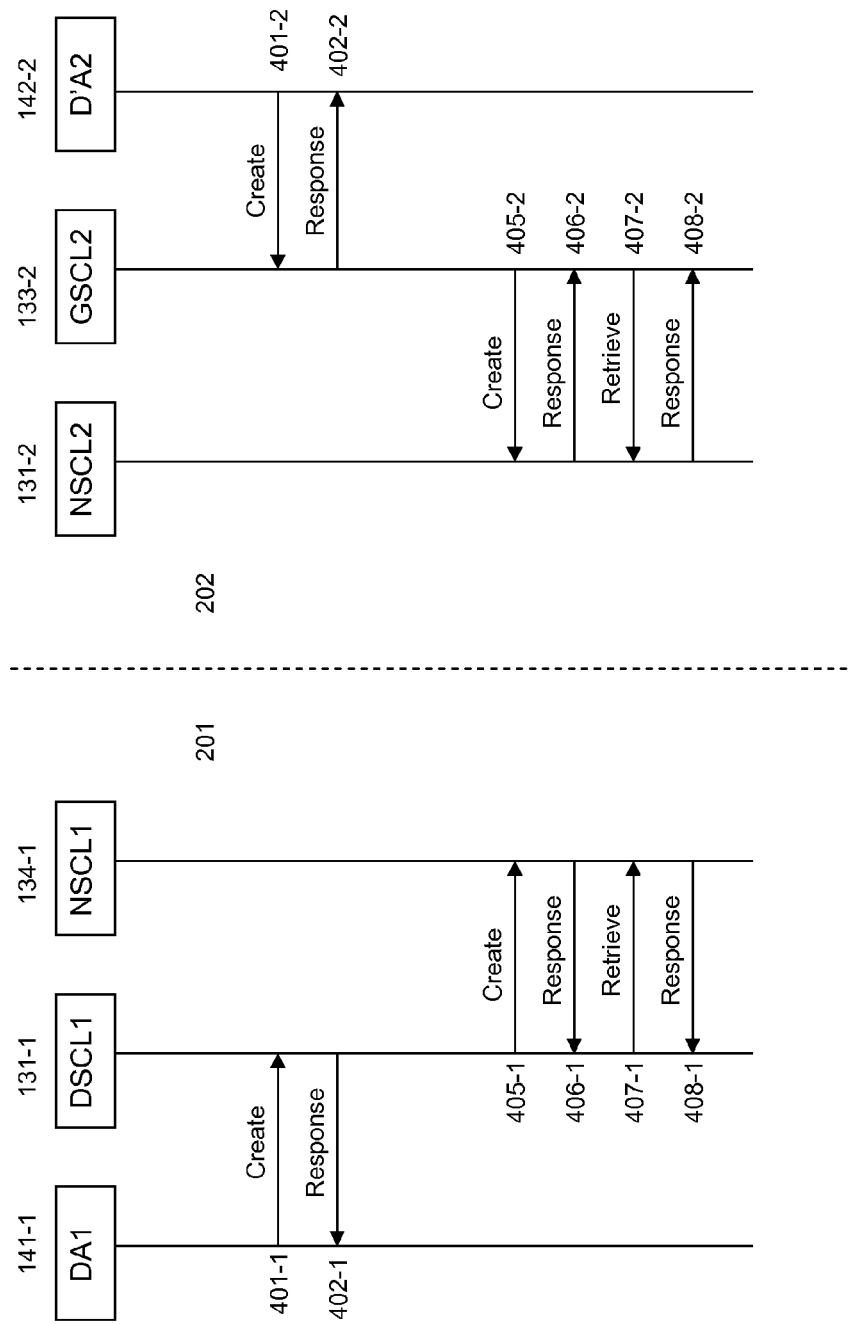
FIG. 4 illustrates schematically registration procedures at the first and second networks, maintained by two different M2M providers.

FIG. 4 illustrates schematically registration procedures at the first and second networks, maintained by two different M2M providers.

In both networks 201 and 202 registration procedures take place, in principle without mutual interference to each other. FIG. 4 illustrates the registration sequence of the Device application 141-1 via the "dIa" reference point 161.

FIG. 4 indicates the sequences as an example in ETSI M2M primitives:

A first step is an application registration of DA1 141-1 with the DSCL1 131-1;

the 401-1: a registration request from DA1 141-1 to DSCL1 131-1: CREATE <sclBase for DSCL1>/applications,

402-1: a response to the request from DSCL1 131-1 to DA1 141-1: STATUS_CREATED, indicating the creation of a <sclBase for DSCL1>/applications/DA1.

A next step is the SCL registration of the DSCL 131-1 with the NSCL1 134-1 via the "mId" reference point 181;

405-1: a registration request from the DSCL1 131-1 to the NSCL 134-1: CREATE <sclBase for NSCL1>/scls,

406-1: a response to the request from NSCL1 134-1 to DSCL1 131-1: STATUS_CREATED, indicating the creation of <sclBase for NSCL1>/scls/DSCL1

407-1: request for an indication from DSCL1 131-1 to NSCL1 134-1: RETRIEVE <sclBase for NSCL1>,

408-1: response to the request from NSCL1 134-1 to DSCL1 131-1: STATUS_OK.

The result of the procedures shown are the creation of: the resource . . . /<sclBase for DSCL1>/applications/DA1 in DSCL1 131-1, and the resource . . . /<sclBase for NSCL1>/scls/DSCL1 in NSCL1 134-2.

The result of the sequences as exploited in FIG. 4 are presented in FIGS. 3A and 3C, showing the created application and scls resource structures in the DSCL1 131-1, as well as in the scls resource of the NSCL1 134-1 showed in FIG. 3B.

The registration sequences at the second network 202, indicated by reference signs 401-2 until 408-2 map mutatis mutandis to the signal flow reference signs 401-1 until 408-1.

The result of the procedures at the second provider's network 202 are: the resource . . . /<sclBase for GSCL2>/applications/D'A2 in GSCL2 133-2, and the resource . . . /<sclBase for NSCL2>/scls/GSCL2 in NSCL2 134-2

Registration in ETSI M2M is by definition a registration to the "local" SCL. The address of the SCL is obtained either during a bootstrap procedure or being provisioned. The "local" SCL is to be understood as the SCL first met in the topological pyramid in the direction to the top of the pyramid.

Note that the other entities: D'A1, GSCL1, NA1, DA2, DSCL2 and NA2 in FIG. 4 will also perform a registration procedure, but the steps are not described since they are not relevant to the specific example. Also note that the steps above can independently of each other.

As part of the application registration procedure, the SCL where the resource is created, also designated as "local" or "hosting" SCL, will provide the Universal Resource Locator (URI) of the resources created.

The URI, provided by the hosting SCL, does not need to be public; the SCL might provide a private URI which is only valid in the device domain, M2M network or in the local area network of the gateway. The applications may just register locally to a DSCL or GSCL, but the DSCL or GSCL is not registered to an NSCL yet.

When the steps listed above according to the example are performed, the entities:

DA1 141-1 and DSCL1 131-1 are reachable within the M2M network 201 of the first M2M Service Provider;

DA1 141-1 is known to DSCL1 131-1 and vice-versa;

DSCL1 131-1 is known to NSCL1 134-1 and vice-versa;

D'A2 142-2 and GSCL2 133-2 are reachable within the M2M network 202 of the second M2M Service Provider;

D'A2 is known to GSCL2 and vice versa;

GSCL2 is known to NSCL2 and vice versa.

DA1 141-1 and DSCL1 131-1 are not known in the M2M network of second M2M service provider of M2M network 202. Known methods to retrieve knowledge of their existence can only be obtained by so called out-of-band method, meaning that other communication means, e.g. like Short Message Service (SMS), e-mail, etc should be used.

Without the use of out of band methods DA1 141-1 and DSCL1 131-1 are not reachable from entities/applications within the second M2M Service Provider's M2M network 202. The same hold for D'A2 142-2 and GSCL2 133-2 for communication from within the first provider's network 201.

As to accomplish a communication between SCLs and/or applications in ETSI M2M networks the following request routing rules are to be performed regarding requests generated by an application and requests received by an SCL:

1) A DA routes M2M requests to its local SCL (GSCL or DSCL). Local is to be interpreted as its locally present SCL or when not present, the first higher in the topological pyramid-like structure according to FIG. 1.
2) An NA routes M2M requests to its local SCL (NSCL). The Network node 121 by default has an NSCL 134.
3) A DSCL or GSCL that receives an M2M request that is not addressing resources available at the SCL itself, forwards the request to its local SCL (Which is the NSCL 134 according to FIG. 1). A local SCL is be interpreted as the first higher in the topological pyramid-like structure according to FIG. 1.

4) A DSCL, GSCL or NSCL that receives an M2M request, wherein the URI comprised by the request is subordinate to the URI of a local application resource, routes this requests to the local application in case retargeting is enabled by the application by providing an aPoc (application Point of contact).

As an example: A request to a target ID represented by: <sclBase for GSCL1>/applications/DA1/Gapocpath> or one of its subordinates is routed to the aPoc of application DA1, if apocpath is one of the paths indicated in the aPocPath attribute and there is an aPoC attribute defined.

The aPoc is a URI that identifies how request are re-targeted) and aPocPath (Path for possible re-targeting under aPoc) attributes in the local application resource.

The aPocPaths, if present, is used to determine if a targetURI is to be re-targeted, by doing a prefix match against the elements in the path. Each path can optionally have an accessRightID associated with it, which, if present, is used for authorization purposes when doing the retargeting.

The accessRightID of the best matching path prefix is used for this purpose. The value of aPoCPaths is only relevant when the aPoC attribute is also present.

5) An NSCL that receives a request that is not addressing a resource on the NSCL itself, forwards the request to an SCL that has registered to the NSCL based on the link attribute in the SCL resource representing the registration. It uses the information in the M2M Point of Contact (M2MPoc) to route the request to the SCL.

An M2MPoC provides the set of information needed to reach an SCL from a network perspective. Typically an M2MPoC contains information that is e.g. resolved into a network address.

The idea presented makes use of a Domain Name Server (DNS) concept for solving the problem described above. The DNS can be public or having a restricted availability, e.g. only for M2M providers or M2M providers having an agreement.

In order to be able to use DNS, the Universal Resource Identifier (URI) of the resource created by the registration procedure need to be known by a DNS server.

The current ETSI specifications do neither provide any indication on the sclBase hostname structure of the NSCL 134 nor the relation between the xSCL (where x denotes a "D" for a DSCL or a "G" for a GSCL) and the NSCL where the xSCL registers in terms of URIs or hostnames.

The fact of having the SCL URIs independent from the domain of the NSCL, make the usage of DNS quite complicated, therefore this invention propose to define a specific domain for the all SCLs residing in a M2M Service Provider.

The specific M2M network domains 201 and 202 of the first and second M2M providers respectively are to be registered in a DNS.

With respect to the first domain 201, the entities DA1 141-1, D'A1 104-1, DSCL1 131-1, GSCL1 133-1, NSCL1 134-1 are to be registered in the DNS. The entities of the second domain 202, DA2 141-2, D'A2 142-2, DSCL2 131-2, GSCL2 133-2 and NSCL2 134-2 are to be registered as wel in the DNS.

As an example of a structure how the entities are registered in example domains in A-records for Internet Protocol version 4 (IPv4) or AAAA-records for Internet Protocol version 6 (IPv6):

DSCL1, GSCL1 and NSCL1 are registered in domain1.com for first M2M network 201 with the following A- or AAAA-records. Two options exist:

Option 1: independent entry for each M2M network entity in the DNS:
  nscl1.domain1.com for NSCL1, associated with the IP-address of NSCL1
  gscl1.nscl1.domain1.com for GSCL1, associated with the IP-address of NSCL1
  dscl1.nscl1.domain1.com for DSCL1, associated with the IP-address of NSCL1 option 2: one entry for the complete subdomain of a specific M2M network having the pyramid-like structure.
  *.nscl1.domain1.com for NSCL1, associated with the IP-address of NSCL1

DSCL2, GSCL2 and NSCL2 are registered in domain2.com with the following A- or AAAA-records having the same options as for second M2M network 201 above, having the equivalent records mutatis mutandis.

Option 2 is has an advantage if all devices and gateway belonging to a specific domain need to be known outside the domain. By using the second option, by default every new device or gateway that is added to the domain will be automatically part of the DNS entry.

A and AAAA-records comprise the Internet Protocol (IP) address of a hostname, to be used for a lookup when an URI or Fully Qualified Domain Name (FQDN) has to be translated into an IP address.

Note that applications, in principle according to ETSI M2M, do not belong to the M2M Service Provider domain. Therefore the applications can have a completely different domain. However registration of an Application such as DA1 141-1 or D'A2 142-2 to an SCL will belong to the specific M2M Service Provider's domain 201, 202 respectively.

Hostnames for DSCLx (DSCL1 and DSCL2) and GSCLx (GSCL1 and GSCL2) have the following format:
  <SCL_ID>.<NSCL_ID>.<SP_domain>

Where:
Service Provider, SP, M2M network domain is the registered domain of a specific M2M Service Provider (e.g. domain1.com in the example above).
"NSCL_ID" is the identifier of the NSCL belonging to the M2M Service Providers domain (e.g. "nscl1" in the example above).
"SCL_ID" is the identifier of the SCL (either GSCL or DSCL) that is registered with the NSCL with the identifier "NSCL_ID" (e.g. "dscl1" in the example above).

Each resource, i.e. a storage location for exchanging data, residing in an SCL styled as a REpresentational State Transfer (RESTful) architecture, that can be addressed according to ETSI M2M shall be added to a DNS, which means the following URIs:
  <sclBase for DSCL1>/applications/DA1 where the hostname part is: dscl1.nscl1.domain1.com, which provides the IP-address of DSCL1 131-1; and
  <sclBase for NSCL1>/scls/DSCL1 where the hostname part is: nscl1.domain1.com, which provides the IP address of NSCL1 134-1; and <sclBase for GSCL2>/applications/D'A2 where the hostname part is: gscl2.nscl2.domain2.com, which provides the IP address of GSCL2 133-2; and <sclBase for NSCL2>/scls/GSCL2 where the hostname part is: nscl2.domain2.com, which provides the IP address of NSCL2 134-2.

The URIs listed above correspond to A- and AAAA-records in the DNS.

It is the responsibility of the NSCL 134-1, 134-2 to update the DNS entries whenever a new DSCL or GSCL is registering.

An application that is registering to a SCL might need to know the URI of the SCL where it is registered.

In order to be able to provide such information, the DSCL or GSCL will receive as result of the registration a URI from the NSCL and stores the URI in a newly introduced attribute that needs to be added to the sclBase resource of the registering DSCL or GSCL.

With reference to the list of attributes provided by ETSI M2M standard TS 102 690, presenting a functional architecture, an attribute, its name suggested as "publicAddresses" are alternatively designated as "externalAddresses", is provided, where this attribute comprises the public afddress of an SCL wherein the attribute resides.

Figure 5:
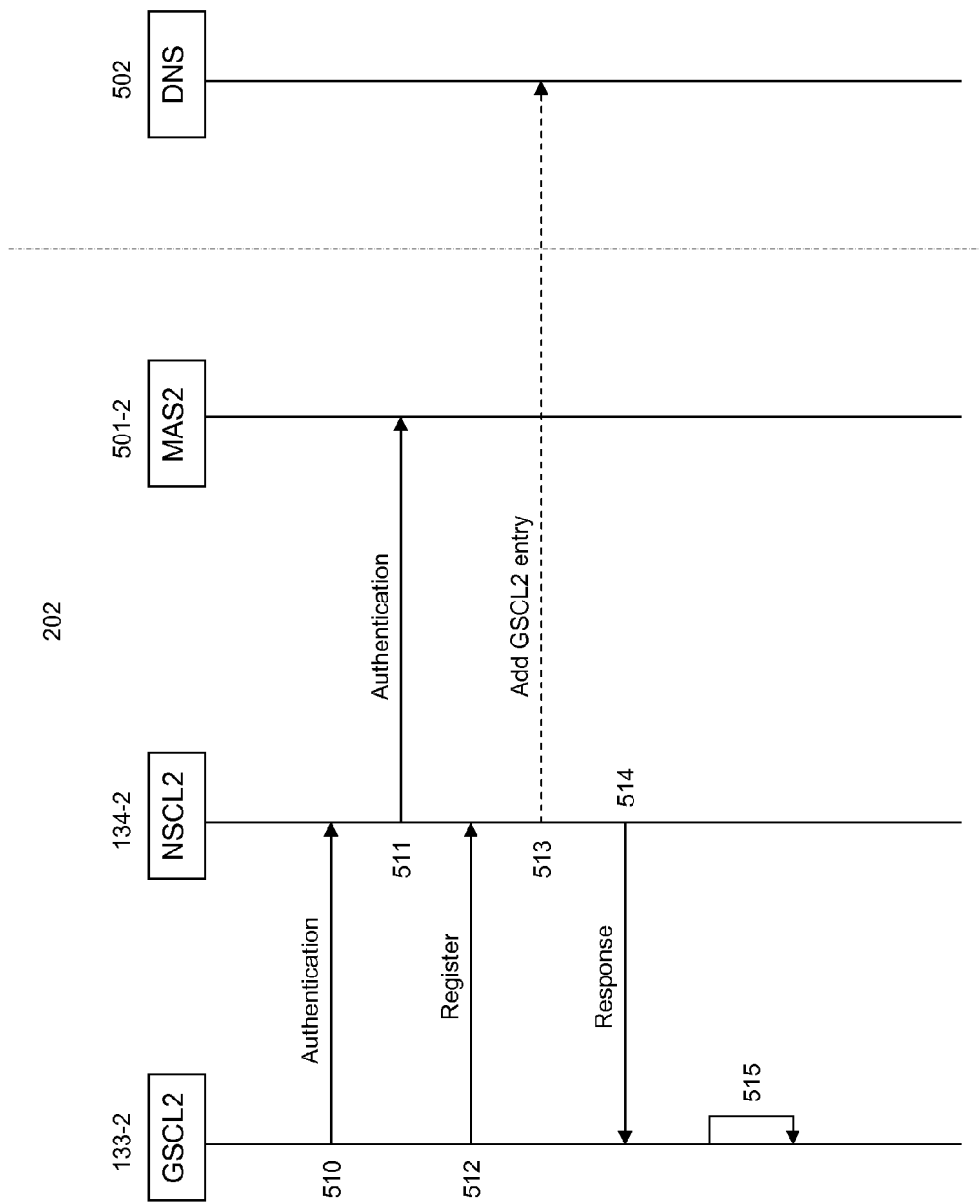
FIG. 5 illustrates schematically a message diagram wherein GSCL2 initiates DNS registration by means of the NSCL2 134-2.

FIG. 5 illustrates schematically a message diagram wherein GSCL2 initiates DNS registration by means of the NSCL2 134-2.

FIG. 5 introduces network entities, M2M Authentication server (MAS2) 501-2 and Domain Name Server (DNS) 502, both communicatively connected to the among others GSCL2 133-2 and NSCl2 134-2.

In FIG. 5 an example domain name of nscl2.domain2.com for the NSCL2 134-2 is presumed.

As a precondition to the registration procedure showed by FIG. 5, it has to be defined that:

The GSCL2 133-2 needs to have an authentication key provisioned, including the provision of the NSCL2 name or address, e.g. by an "out of band" method such as via Short Mail Service (SMS) or e-mail.

The NSCL2 is known as entity in example domain "domain2.com".

The NSCL2 is assumed to already have an entry in the DNS 502 and it is known by a public address: nscl2.domain2.com/<sclBase for NSCL2> which is also stored in the attribute "publicAddresses" of its "sclBase" resource.

The M2M Authenthication server (MAS2) 501-2 has an authentication key for GSCL2 provisioned The steps presented in FIG. 5:

510: GSCL2 133-2 authenticates with the NSCL2 134-2,

511: NSCL2 134-2 checks with MAS2 501-2 the authentication key of GSCL2 133-2,

512 GSCL2 133-2 requests registration with the NSCL2 134-2 providing identifier "GSCL2" as parameter ID, resulting in the creation of an URI of the resource representing GSCL 133-2. As the NSCL already has a URI, this URI "creation" is limited to pre-pending the GSCL2 ID before the hostname of NSCL2, see also step 515,

513: Optionally, as it is implicitly already in DNS 502, NSCL2 134-2 submits a request to DNS 502 to add an entry for gscl2.nscl2.domain2.com,

514: NSCL2 134-2 submits a response to GSCL2 133-2 of the result of the registration with the URI of created resource: nscl2.domain2.com/<sclBase for NSCL2>/scls/GSCL2,

515: On reception of response 514, GSCL2 133-2 initializes an internal procedure to create a URI whereby GSCL2 133-2 will be known by: gscl2.nscl2.domain2.com. This name will be stored in the "publicAddresses" attribute of the SCL of GSCL2 133-2.

Applications registered on GSCL2 133-2, such as D'A2 142-2, will be able to retrieve the address of GSCL2 133-2 if required.

For example, D'A2 142-2 uses a RETRIEVE sclBase procedure in order to get the content of the attribute "publicAddresses".

Continuing with the problem example, after the entities are properly registered to the correspondent M2M Service Provider network, as described above, the application DA1 141-1 needs to access information which is owned by GSCL2 133-2, for example the information about D'A2 142-2.

Figure 6:
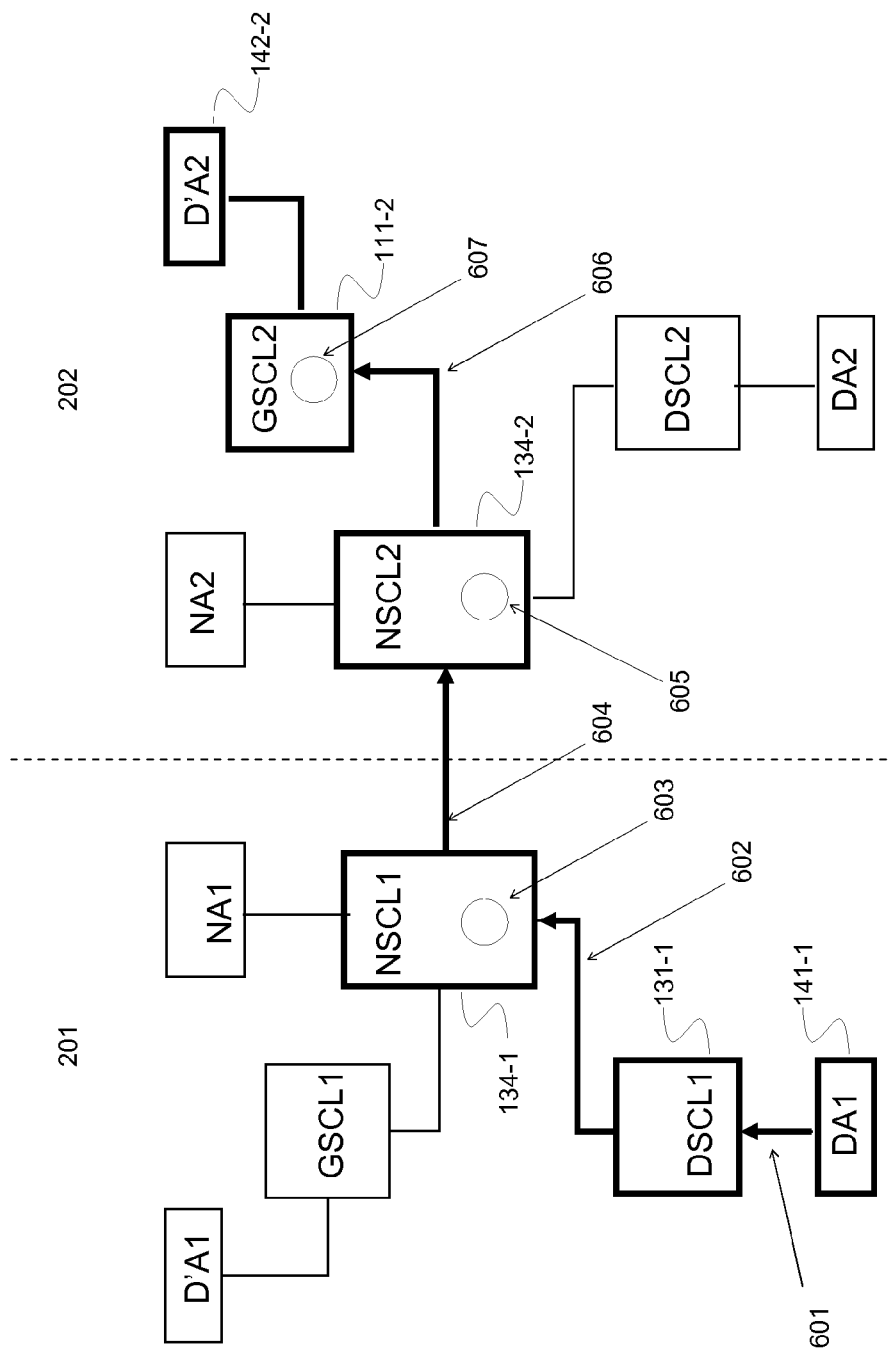
FIG. 6 illustrates schematically the summary of sequences of events occurring in an inter M2M network service.

FIG. 6 illustrates schematically the summary of sequences of events occurring in an inter M2M network service.

A summary of sequences of events 601-608, accompanied with messages, is presented as to have Device Application DA1 141-1 retrieve information provided by Device Application D'A2 142-2.

Details of the summary of sequences of events are depicted in additional figures.

Figure 7:
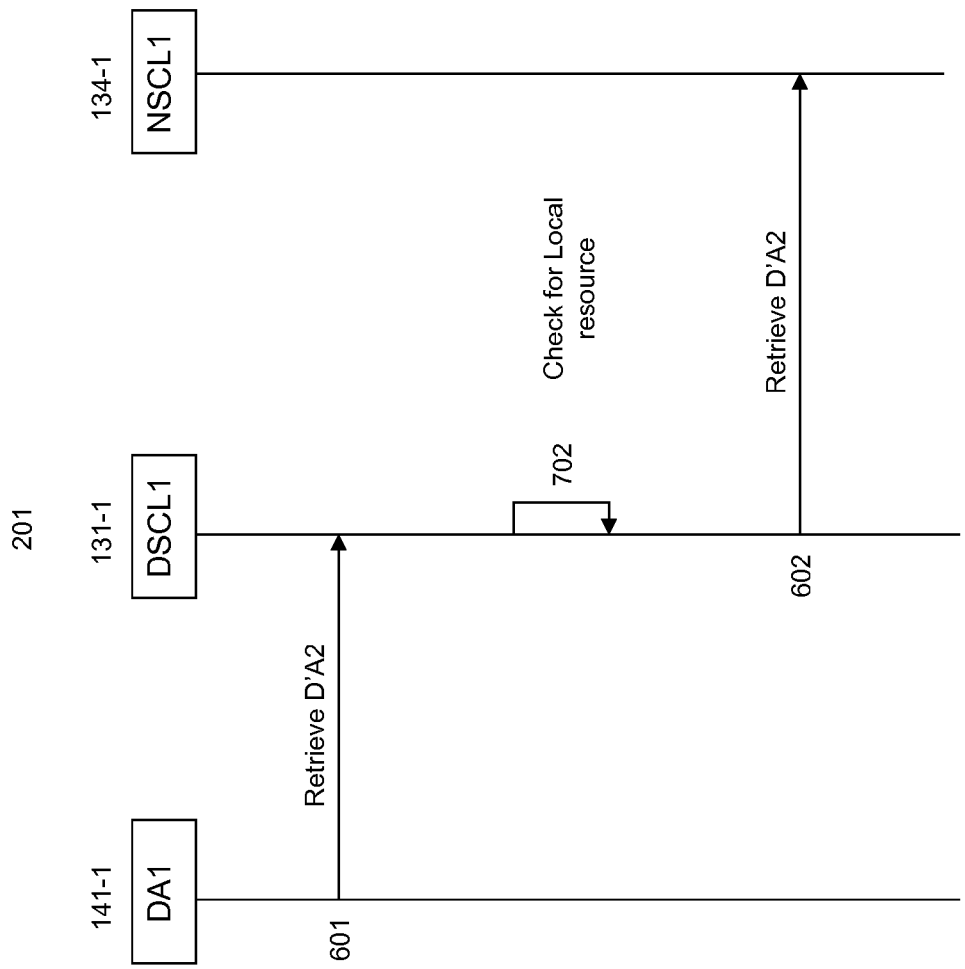
FIG. 7 illustrates schematically the messages involved in steps 601 and 602 of FIG. 6.

FIG. 7 illustrates schematically the messages involved in steps 601 and 602 of FIG. 6.

601: the M2M Device Application DA1 141-1 sends a request to a resource residing in GSCL2 133-2, since DA1 141-1 would like to retrieve information about D'A2 142-2. A RETRIEVE request will address a resource with an URI starting with "gscl2.nscl2.domain2.com/<sclBase for GSCL2>/applications/D'A2".

The DA1 application came to have knowledge of the address where information of D'A2 resides by an out-of-band mechanism. In general it would be via some configuration of the application itself. Application DA1 doesn't know where D'A2 is registered, it only knows the URI. However NSCL1 understands from the URI that the application D'A2 is registered in another domain and the lookup on DNS provides the IP-address corresponding to the URI. The address indicates however the SCL-ID and the domain where the D'A2 application is registered since the address is embedded in the URI of D'A2, as D'A2 is registered to GSCL2

The request is routed to the local SCL where DA1 is registered being DSCL1 131-1.

702: DSCL1 131-1 will check if the addressed resource is a local resource residing in its local tree, since the resource is not residing in the DSCL1, the request has to be forwarded to the SCL where DSCL1 has been registered, being NSCL1.

602: DSCL1 forwards the request to its local SCL (NSCL1, where DSCL1 is registered). The term "local SCL" is defined by TS 102 690 and is the SCL where the requesting entity (DSCL1 in this case) is registered. "Local" is to be interpreted as locally available, and if not, the first higher SCL in the pyramid-like structure. A RETRIEVE request with an URI starting with "gscl2.nscl2.domain2.com/<sclBase for GSCL2>/applications/D'A2" is submitted to NSCL1 134-1.

Figure 8:
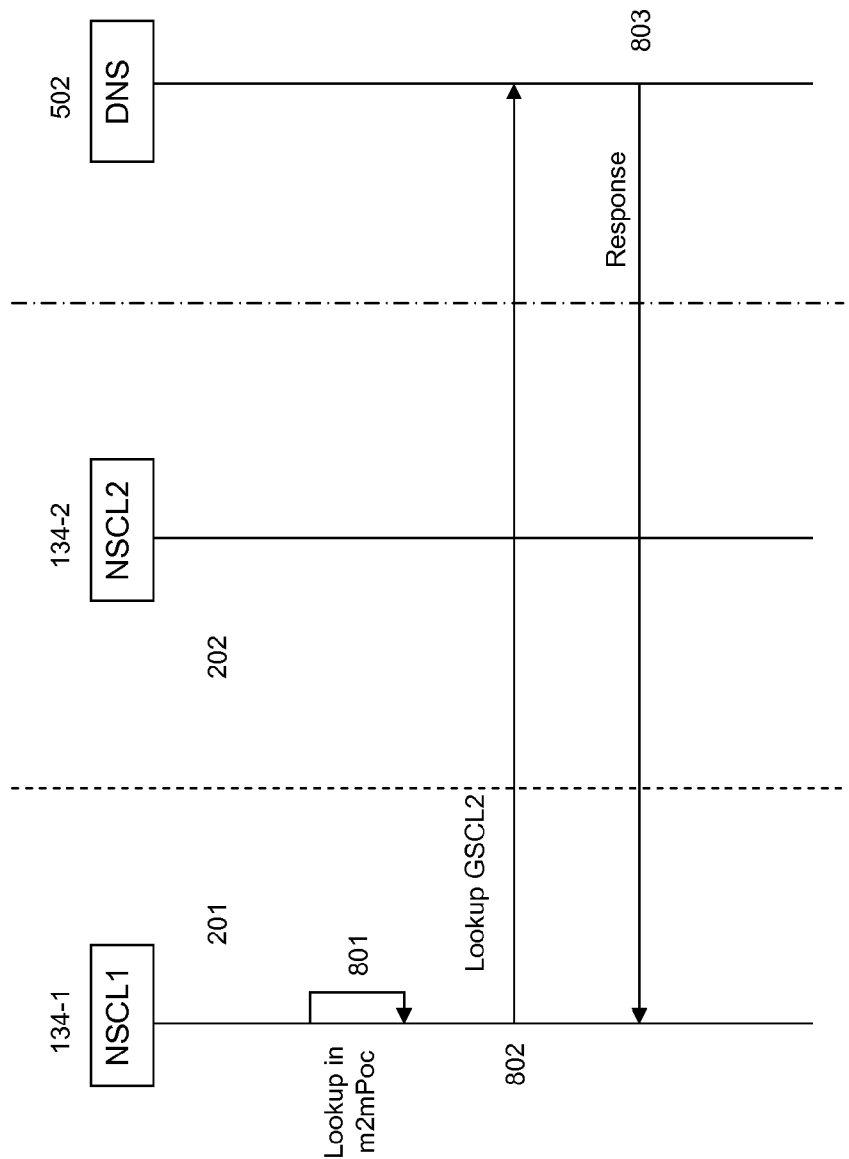
FIG. 8 illustrates schematically the messages involved in step 603 of FIG. 6.

FIG. 8 illustrates schematically the messages involved in step 603 of FIG. 6 in order to obtain the address of NSCL2.

603: the addressed resource <sclBase for GSCL2 ... > is not residing in the NSCL1 134-1 and the URI of GSCL2 (submitted by DA1) is not matching 801 any values of M2M Point of contact (M2MPoc) resources stored within NSCL1, which means that the addressed resource is not residing in the domain of the first M2M Service Provider, domain 201. Therefore the request needs to be forwarded to the network of the appropriate M2M Service Provider. In order to find the proper M2M Service Provider, NSCL1 134-1 performs a DNS lookup 802 for "gscl2.nscl2.domain2.com/<sclBase for GSCL2>/applications/D'A2".

The DNS lookup will result 803 in the address of the NSCL of M2M Service Provider 2 (NSCL2).

An M2MPoc provides the set of information needed to reach an SCL from a network perspective. Typically an M2MPoc contains information that is e.g. resolved into a network address.

Forwarding the request 601 originated from DA1 141-1, by NSCL1 134-1 towards NSCL2 134-2 depends on the mutual connectivity status of both entities, providing alternatives for step 604:
   a)—NSCL1 134-1 forwards the request to NSCL2 134-2 supported by DNS.
   b)—NSCL1 134-1 starts a mutual registration procedure with NSCL2 134-2 before forwarding the request.

In both alternatives a) and b), the first and second M2M Service Providers that service entities that need to communicate, are in general required to have an agreement in place in order to be able to communicate.

The difference between both alternatives a) and b) is that for alternative b), once the path between NSCL1 134-1 and NSCL2 134-2 is established it will be maintained by means of a registration, where both NSCLs will have a resource representing the other NSCL. This resource can also be seen and reached in accordance with the "accessRights" attribute comprised by the sclBase of the NSCLs by other entities (e.g. applications).

For the prsentation of the invention, Alternative b) with the mutual registration will be explained.

When an NSCL1 134-1 in domain 201 needs to communicate with NSCL2 134-2 in domain 202, it needs to perform a mutual registration procedure which can be executed on initialization of the network nodes or by a demand registration scenario.

An on demand registration scenario when a request is received: i.e. demanding that when an NSCL receives a request not targeting local resources or subordinate resources of local resources, and for which there is no registered or announced resource as described in the routing rules listed above, then the NSCL shall perform a DNS lookup on the Fully Qualified Domain Name (FQDN) in the targetID.

The DNS lookup will have to give the address of the NSCL2 as resources in M2M network 202 behind the remote NSCL2 are not supposed to be available as A or AAAA records in DNS. On demand can be applied as a first time that an address of an SCL or application residing in M2M network 202 is requested or on demand basis.

Other information needed for mutual registration is the NSCL-ID of the remote SCL. This information can either be:
   looked up in a table providing the mapping between FQDN and NSCL-ID.
   encoded in the URI (assuming the structure of the URI contains the NSCL-ID of the remote NSCL).
obtained from public or private DNS, or by using a subnet.

Figure 9:
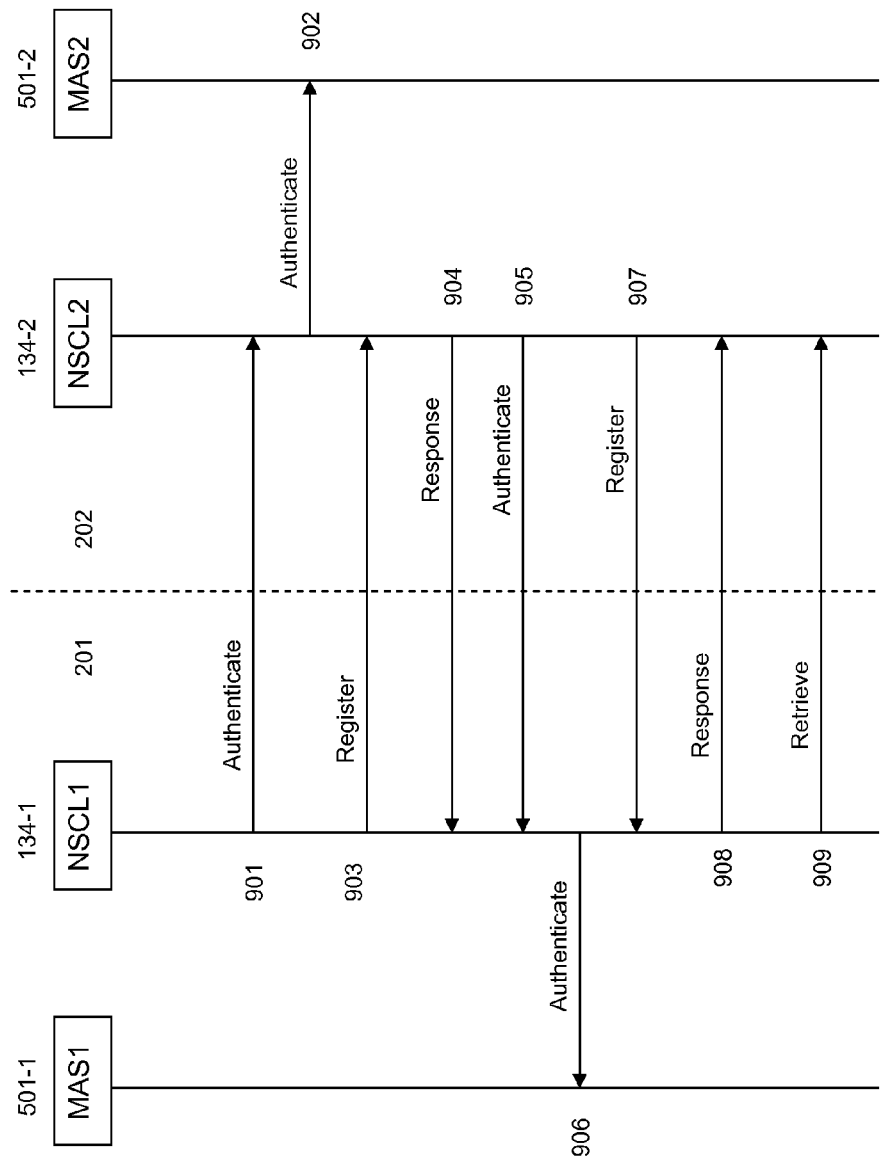
FIG. 9 illustrates schematically a mutual registration procedure of NSCLs of different domains.

FIG. 9 illustrates schematically a mutual registration procedure of NSCLs of different domains.

An adapted DSCL or GSCL registration method is applied to have NSCLs mutually registered.

Mutual authentication of the two endpoints, NSCL1 134-1 and NSCL2 134-2, is required for secure authenticated connectivity. In order to perform this mutual authentication an M2M Root Key (Kr) needs to be provisioned in both M2M Service Provider domains, 201 and 202. More precisely the M2M Authentication Server MAS2 501-2 associated with NSCL2 134-2 of M2M network 202 will need to have a Kr representing the bilateral association with NSCL1 134-1; respectively the MAS1 501-1 associated with NSCL1 134-1 will have a Kr representing the bilateral association with NSCL2 134-2. This Kr is needed for establishing secure communication.

As a precondition to the mutual registration procedure presented by FIG. 9 it is required that both M2M Service providers have secure keys provisioned in their own MAS. The procedure for provisioning these keys is not defined by ETSI M2M. The keys can be executed out of band, as explained with FIG. 5.
   901: NSCL1 134-1 submits an Authentication request towards NSCL2 134-2,
   902: NSCL2 134-2 forwards the Authentication request to MAS2 501-2, which resonds with a reply (not shown),
   903: On a successful authentication NSCL1 134-1 submits a request to be registered in the sclBase for NSCL2 134-2 by providing the NSCL1 as ID,
   904: NSCL2 134-2 returns a result of the registration request. The result is "nscl2.domain2.com/<sclBase for NSCL2>/scls/NSCL1",
   905: In response to the registration request 903, NSCL2 123-2 initiates authentication with NSCL1 134-1,
   906: NSCL1 134-1 forwards the Authentication request to MAS1 501-1, which resonds with a reply (not shown).
   907: On a successful authentication NSCL2 134-2 submits a request to be registered in the sclBase for NSCL1 134-1 by providing the NSCL2 as ID,
   908: NSCL1 134-1 returns a result of the registration request, causing a representation of NSCL2 as a resource in the SCL of NSCL1, "nscl1.domain1.com/<sclBase for NSCL1>/scls/NSCL2",
   909: As both NSCLs have been mutually registered, the request originated by DA1 141-1 is forwarded by NSCL1 134-1 towards NSCL2 134-2 for further processing. The request is represented by: 'RETRIEVE gscl2.nscl2.domain2.com/<sclBase for NSCL2>scls/GSCL2/applications/D'A2".

The registration procedure above differs from the ETSI M2M SCL procedure for a DSCL or GSCL registration, the registering NSCL does not create by itself a resource representing the registeringTo SCL (NSCL2), but NSCL1 expects NSCL2 to register in response to the registration request of NSCL1.

Mutual registration, as explained above can be executed either as an initial procedure or an on demand process, requiring for each request for an entity of a remote domain, a new mutual registration procedure.
   605: After the NSCL2 134-2 has received the request addressed to GSCL2 133-2, it will search in the tree of its local SCL for the registration information related to GSCL2 133-2. Once found the registration information, it will read an address from the M2MPoc resource for GSCL2 133-2 and uses the obtained address for forwarding the request to GSCL2.

606: NSCL2 134-2 forwards the request originateed by DA1 141-1, to GSCL2 133-2 using the obtained address in step 605.

607: GSCL2 133-2 receives the request sent by NSCL2 134-2 and checks its accessRight attribute in order to verify if DA1 141-1 has permission to access the requested information; then GSCL 133-2 allows or rejects the access to the requested GSCL2 resource in accordance with the accessRight. In order to allow DA1 141-1 to access the addressed resource, as a precondition DA1 141-1 has to be added to the accessRights associated to the resource in the GSCL2 133-2.

GSCL2 133-2, receiving the request, processing the request and responds to the first entity via a path created by the previous steps. No accessRight is needed for the response The DNS applied in the URI to adress lookup processes depicted above can be a public DNS, a DNS restricted for M2M providers or a DNS restricted to particular provider domains. A DNS may apply a rule whether an M2M entity that registers is to be stored in its (A or AAAA) records based on policies.

After the steps described above are performed, the communication path between NSCL1 134-1 and NSCL2 134-2 is established.

The reference point 210 between the NSCLs is suggested to be named "mIn". The "mIn" reference point is applied for authentication, registration, and request forwarding between NSCLs.

FIG. 10A illustrates schematically a Network node, also denoted as network node or network domain 121.

Network node 121 comprises an NSCL 134, comprising;

10A1: processing unit for receiving, processing and generating requests and replies.

10A2: storage medium applied for storing e.g resources of the SCLs and programs and variables for processor 10A1.

Optionally network node 121 further comprises Network application 145 comprising:

10A3: application entity in software and/or hardware form.

10A4: storage medium applied for information, programs and variables for application 10A3.

Application entity 145 is communicatively connected to NSCL 134 via interface, reference point, "mIa" 171. Application 145 and NSCL 134 can be housed in one node or housed in separate co-located nodes, albeit connected via interface "mIa" 171.

Network node 121 is communicatively connected to its environment via interface "mId" 181 typically to SCLs of other network entities within the same M2M network domain, and "mIn" 210 typically communicatively connected to one or more NSCLs.

Additional interface 10A5 can be used for processor access for e.g. monitoring, provisioning, etc.

FIG. 10B illustrates schematically a Device 102 or Gateway 111 entity respectively.

As Devices and Gateways constitute generally the same structure, these entities are explained in a single figure, pointing out differences in the text below.

The Device 102 or Gateway 111 node comprises:

Device 102 and Gateway 111 comprise a DSCL 131 and GSCL 133 respectively. The DSCL 131 and GSCL 133 comprising:

10B1: processing unit for receiving, processing and generating requests and replies.

10B2: storage medium applied for storing e.g resources of the SCLs and programs and variables for processor 10A1.

Optionally DSCL 131 and GSCL 133 entities further comprise a Device application 141 and a Gateway application 144 respectively, the Device- and Gateway application comprising:

10B3: application entity in software and/or hardware form.

10B4: storage medium applied for information, programs and variables for application 10A3.

Application 141 and 144 are communicatively connected to DSCL 131 and GSCL 133 respectively via interface, reference point, "mIa" 161 and 162 respectively. Application 141, 144 and DSCL 131, GSCL 133 can be housed in one node or housed in separate co-located nodes, albeit connected via interfaces "mIa" 161 and 162 respectively.

DSCL 131 and GSCL 133 are communicatively connected to the environment via interface "mId" 181 typically to SCLs of other network entities within the same M2M network domain.

Additional interface 10B5 can be used for processor access for e.g. monitoring, provisioning, etc.

Difference between a Gateway 111 and a Device 102 node is that a Device node does not have to have an local SCL. Device node 104 (see FIG. 1) is an example of a device with an application 142, but without local SCL, using the GSCL of a communicatively connected gateway node 111 via interface, or reference point "dIa" 164.

A comprehension of the requirements to apply the method to have communication between two or more M2M domains:
- a fixed domain structure and consequent hostname definition for DSCLs, GSCLs and NSCLs for each domain.
- the NSCLs will have their own address registered to a DNS.
- the DSCls and GSCLs that are registered to a NSCL will also get an address that is registered to the DNS by the NSCL.

The invention enabling M2M interservice communication, and defining a new procedure for a mutual registration between NSCLs from different M2M Service Provider domains has the following advantages:
- Re-use of existing mutual authentication mechanism (key based) for the new reference point "mIn".
- Re-use of existing mechanisms for setting a M2M secure channel for the new reference point "mIn"
- Re-use of the well established mechanism of (public) DNS, following the general rules for the public internet.
- Allowing an application to address resources and its subordinate URIs of an entity that is registered in a DNS. The routing of the requests is handled by the M2M entities based on DNS lookups.
- Inter-M2M Service Provider communication is required for permitting devices and applications to provide and receive information from other devices and applications belonging to another M2M Service provider. It is regarded to become a challenge as many M2M Service Providers, organized as verticals, are required to cooperate for the users' needs.
- The method as provided allows control of which resources are discoverable using a public or restricted DNS, applying rules whether certain addresses are stored in- or allow lookup from its records

What is claimed is:

1. A method for communicating between a first Machine-to-Machine (M2M) entity in a first M2M network comprising a first M2M network domain anchored by a first network node operating as a Network Services Capability Layer (NSCL) entity within the first M2M network domain and a second M2M entity residing in a second M2M network comprising a second M2M network domain anchored by a second network node operating as an NSCL entity within the second M2M network domain, said second M2M network domain being distinct from said first M2M network domain, and said method comprising:

the first M2M entity transmitting a request addressed for the second M2M entity in the direction of the first network node;

the first network node receiving the request comprising an identifier identifying the second M2M entity;

the first network node determining, based on the identifier, whether the second M2M entity resides within the first M2M network;

responsive to determining that the second M2M entity does not reside in the first M2M network, requesting a Domain Name server (DNS) node for a lookup on a hostname included in the request, the DNS node responding with an address of the second network node, based on having an address record mapped to the hostname;

the first network node using the address of the second network node to route the request to the second network node via a communication interface communicatively coupling the first and second M2M network domains;

the second network node forwarding the request to the second M2M entity; and the second M2M entity receiving the request, processing the request and responding to the first M2M entity via a path created by the previous steps.

2. The method of claim 1, wherein the first M2M entity is one among one or more M2M entities registered to the first network node in the first M2M network domain, which has a first domain name, and the second M2M entity is one among one or more M2M entities registered with the second network node in the second M2M network domain, which has a second domain name.

3. The method of claim 2, further comprising the second network node creating a unique hostname for each of the one or more M2M entities registered registered with the second network node in the second M2M network domain.

4. The method of claim 2, further comprising the second network node requesting the DNS node to create records for the one or more M2M entities registered with the second network node.

5. The method of claim 1, wherein the address record in the DNS node comprises a unique hostname record, pointing to the address of the second network node.

6. The method of claim 1, wherein the DNS node has for the second M2M entity residing in the second M2M network a subdomain, pointing to the address of the second network node.

7. The method of claim 1, further comprising the second M2M entity receiving the unique hostname of the second M2M entity.

8. The method of claim 7, further comprising the second M2M entity storing the unique hostname of the second M2M entity in as an attribute within an M2M resource structure hosted by the second M2M entity.

9. The method of claim 8, wherein an application, residing in the second M2M network and registering with the second M2M entity, retrieves the unique hostname of the second M2M entity.

10. The method of claim 1, wherein the first M2M entity is an application residing in the first M2M network.

11. The method of claim 1, wherein the first and second M2M networks each use an M2M resource structure having a REpresentational State Transfer (RESTful) architecture style.

12. The method of claim 1, wherein the first and second M2M networks comply with the M2M standards published by the European Telecommunications Standards Institute (ETSI).

13. A system comprising:

a first Machine-to-Machine (M2M) entity registered in a first M2M network comprising a first M2M network domain, the first M2M entity configured to transmit a request addressed for a second M2M entity in the direction of a first network node anchoring the first M2M network and operative as a Network Services Capability Layer (NSCL) entity within the first M2M network domain;

the first network node comprising communication interface circuitry configured to receive the request, and further comprising processing circuitry configured to:
  determine, based on an identifier included in the request, whether the second M2M entity resides within the first M2M network;
  responsive to determining that the second M2M entity does not reside in the first M2M network, request a Domain Name Server (DNS) node for a lookup on a hostname included in the request, the DNS node responding with an address of a second network node anchoring a second M2M network comprising a second M2M network domain and operative as an NSCL entity within the second M2M network domain, the second M2M network domain being distinct from the first M2M network domain and the second M2M entity being registered with the second network node, said DNS node having an address record mapped the hostname; and
  route the request towards the second network node, via the communication interface circuitry; and wherein the second network node is configured to forward the request to the second M2M entity, and the second M2M entity is configured to receive the request, process the request and respond to the first M2M entity via a path created by the previous node and entity operations.

14. A method in a first network node operative as a Network Services Capability Layer (NSCL) entity within a first Machine-to-Machine (M2M) network comprising a first M2M network domain, the method comprising:

receiving a request from a first M2M entity registered in the first M2M network domain, the request targeting a second M2M entity;

determining, based on an identifier included in the request, whether the second M2M entity resides in the first M2M network;

responsive to determining that the second M2M entity does not reside in the first M2M network, requesting a Domain Name Server (DNS) node for a lookup on a hostname included in the request;

receiving a response from the DNS node that includes an address of a second network node operative as an NSCL entity within a second M2M network comprising a second M2M network domain distinct from the first M2M network domain, the second M2M entity being registered to the second network node; and routing the request to the second network node using the address received from the DNS node.

15. A first network node configured to operate as a Network Services Capability Layer (NSCL) entity in a first Machine-to-Machine (M2M) network comprising a first M2M network domain, the first network node comprising:

communication interface circuitry configured to communicate with one or more other network nodes hosting one or more other M2M entities within the first M2M network domain, and to communicate with nodes in one or more external networks;

processing circuitry configured to:
receive a request from a first M2M entity registered in the first M2M network domain, the request targeting a second M2M entity;

determine, based on an identifier included in the request, whether the second M2M entity resides in the first M2M network;

responsive to determining that the second M2M entity does not reside in the first M2M network, request a Domain Name Server (DNS) node for a lookup on a hostname included in the request;

receiving a response from the DNS node that includes an address of a second network node operative as an NSCL entity within a second M2M network comprising a second M2M network domain distinct from the first M2M network domain, the second M2M entity being registered to the second network node; and route the request to the second network node using the address received from the DNS node.

* * * * *